US012807109B2

(12) United States Patent
Jordan et al.

(10) Patent No.: US 12,807,109 B2
(45) Date of Patent: Nov. 24, 2026

(54) SYSTEM AND METHOD FOR DECODING WHEEL SPEED SENSOR DATA TO OPTIMIZE VEHICLE BRAKING CONTROL

(71) Applicant: ZF Friedrichshafen AG, Friedrichshafen (DE)

(72) Inventors: Paul Jordan, Lincoln Park, MI (US); Peter Baumgartner, Rhens (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 8 days.

(21) Appl. No.: 19/192,846

(22) Filed: Apr. 29, 2025

(65) Prior Publication Data

US 2025/0340190 A1 Nov. 6, 2025

Related U.S. Application Data

(60) Provisional application No. 63/641,100, filed on May 1, 2024.

(51) Int. Cl.
*B60T 8/32* (2006.01)
*B60T 8/171* (2006.01)
(Continued)

(52) U.S. Cl.
CPC .............. *B60T 8/329* (2013.01); *B60T 8/171* (2013.01); *B60T 8/172* (2013.01); *G01P 3/481* (2013.01);
(Continued)

(58) Field of Classification Search
CPC . B60T 8/32; B60T 8/239; B60T 8/171; B60T 8/172; G01P 3/481
(Continued)

(56) References Cited

U.S. PATENT DOCUMENTS 11,884,253 B2 * 1/2024 Hwang .................. B60T 8/171
2015/0120164 A1 4/2015 Kim
(Continued)

FOREIGN PATENT DOCUMENTS

DE 102021212324 A1 5/2023
EP 3643570 A1 4/2020

OTHER PUBLICATIONS

Extended European Search Report for EP25173825.8 dated Sep. 10, 2025, 14 pages.

*Primary Examiner* — Andrew Joseph Rudy
(74) *Attorney, Agent, or Firm* — Miller Johnson

(57) ABSTRACT

A computerized method of controlling a brake assembly applied to a wheel includes receiving, by a decoder circuit, an input signal from a sensor. The input signal indicates rotational speed of a wheel of a vehicle. The method also includes determining, by the decoder circuit, which sensor protocol from a set of sensor protocols is currently being used. The method further includes transforming, by the decoder circuit, the input signal to generate an output signal. The decoder circuit sets a pulse width of the output signal based on the determined sensor protocol. The method also includes transmitting, by the decoder circuit, the output signal to a controller. The method additionally includes determining, by the controller, an operational status of the wheel based on the output signal. The method also includes controlling, by the controller, application of the brake assembly to the wheel based on the operational status.

20 Claims, 9 Drawing Sheets

(51) Int. Cl.
*B60T 8/172* (2006.01)
*G01P 3/481* (2006.01)

(52) U.S. Cl.
CPC ....... *B60T 2240/00* (2013.01); *B60T 2250/04* (2013.01)

(58) Field of Classification Search
USPC ............................................................ 701/70
See application file for complete search history.

(56) References Cited

U.S. PATENT DOCUMENTS

| | | | |
|---|---|---|---|
| 2018/0174441 A1 | 6/2018 | Hainz | |
| 2022/0365030 A1 | 11/2022 | Batra | |
| 2025/0110149 A1* | 4/2025 | Feucht .................... | F16D 66/00 |

* cited by examiner

SYSTEM AND METHOD FOR DECODING WHEEL SPEED SENSOR DATA TO OPTIMIZE VEHICLE BRAKING CONTROL

CROSS-REFERENCE TO RELATED APPLICATIONS

This application claims the benefit of U.S. Provisional Application No. 63/641,100 filed May 1, 2024, the entire disclosure of which is incorporated herein by reference.

FIELD

The present disclosure relates to a system for decoding wheel speed sensor data and more particularly to a system for decoding wheel speed sensor data in connection with vehicles.

BACKGROUND

Accurate decoding of wheel speed sensor data is critical for the effective operation of modern vehicle braking systems, particularly in advanced systems such as Anti-lock Braking Systems (ABS) and Electronic Stability Control (ESC). These systems rely on real-time wheel speed data to monitor the vehicle's traction and stability, enabling precise braking force adjustments to prevent skidding, maintain control, and ensure safety during emergency braking or slippery conditions. Inaccurate or delayed decoding of wheel speed data can result in improper brake actuation, potentially leading to reduced braking performance, loss of vehicle control, or increased stopping distances. While known systems for decoding wheel speed sensor data have proven acceptable for their intended purposes, there remains a continuous need for improvement in the relevant art.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

One aspect of the disclosure provides a computerized method of controlling a brake assembly applied to a wheel. The method includes receiving, by a decoder circuit, an input signal from a sensor. The input signal indicates rotational speed of a wheel of a vehicle, and the input signal is based on a set of sensor protocols. The method includes determining, by the decoder circuit, which sensor protocol from the set of sensor protocols is currently being used. The method includes transforming, by the decoder circuit, the input signal to generate an output signal. The decoder circuit sets a pulse width of the output signal based on the determined sensor protocol. The method includes transmitting, by the decoder circuit, the output signal to a controller. The method includes determining, by the controller, an operational status of the wheel based on the output signal, including determining, by the controller, which sensor protocol from the set of sensor protocols is currently being used based on the pulse width of the output signal. The operational status indicates whether the wheel is accelerating or deaccelerating. The method includes controlling, by the controller, application of the brake assembly to the wheel based on the operational status.

Another aspect of the disclosure provides a computerized system for controlling a brake assembly applied to a wheel. The system includes memory hardware configured to store instructions, and processor hardware configured to execute the instructions stored by the memory hardware. The instructions include receiving, by a decoder circuit, an input signal from a sensor. The input signal indicates rotational speed of a wheel of a vehicle, and the input signal is based on a set of sensor protocols. The instructions include determining, by the decoder circuit, which sensor protocol from the set of sensor protocols is currently being used. The instructions include transforming, by the decoder circuit, the input signal to generate an output signal. The decoder circuit sets a pulse width of the output signal based on the determined sensor protocol. The instructions include transmitting, by the decoder circuit, the output signal to a controller. The instructions include determining, by the controller, an operational status of the wheel based on the output signal, including determining, by the controller, which sensor protocol from the set of sensor protocols is currently being used based on the pulse width of the output signal. The operational status indicates whether the wheel is accelerating or deaccelerating. The instructions include controlling, by the controller, application of the brake assembly to the wheel based on the operational status.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
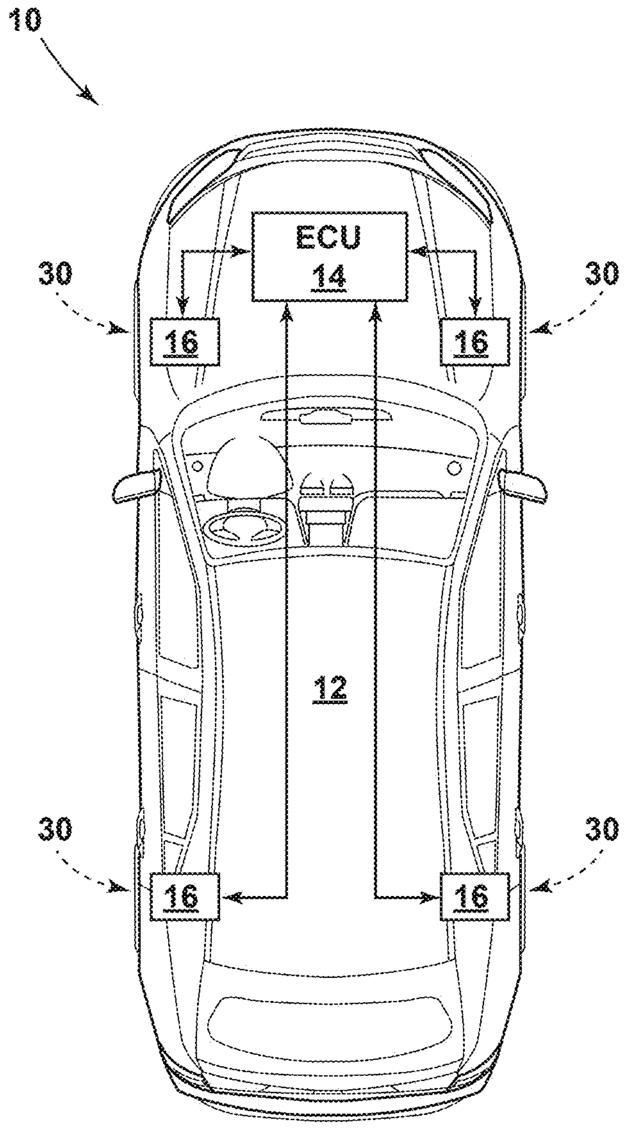
FIGS. 1 and 2 are schematic views of an example system for decoding wheel speed sensor data in accordance with the principles of the present disclosure.

With reference to FIG. 1, an example system 10 for decoding wheel speed sensor data is shown. In various implementations, the system 10 is disposed within a vehicle 12. The system 10 may be incorporated into a braking system (e.g., anti-lock braking system and/or electronic stability control (ESC), among others) of the vehicle 12. In various implementations, the system 10 includes a braking electronic control unit (ECU) 14 and a set of sensors 16, among others. Each sensor 16 may be communicatively coupled to the ECU 14.

Figure 2:
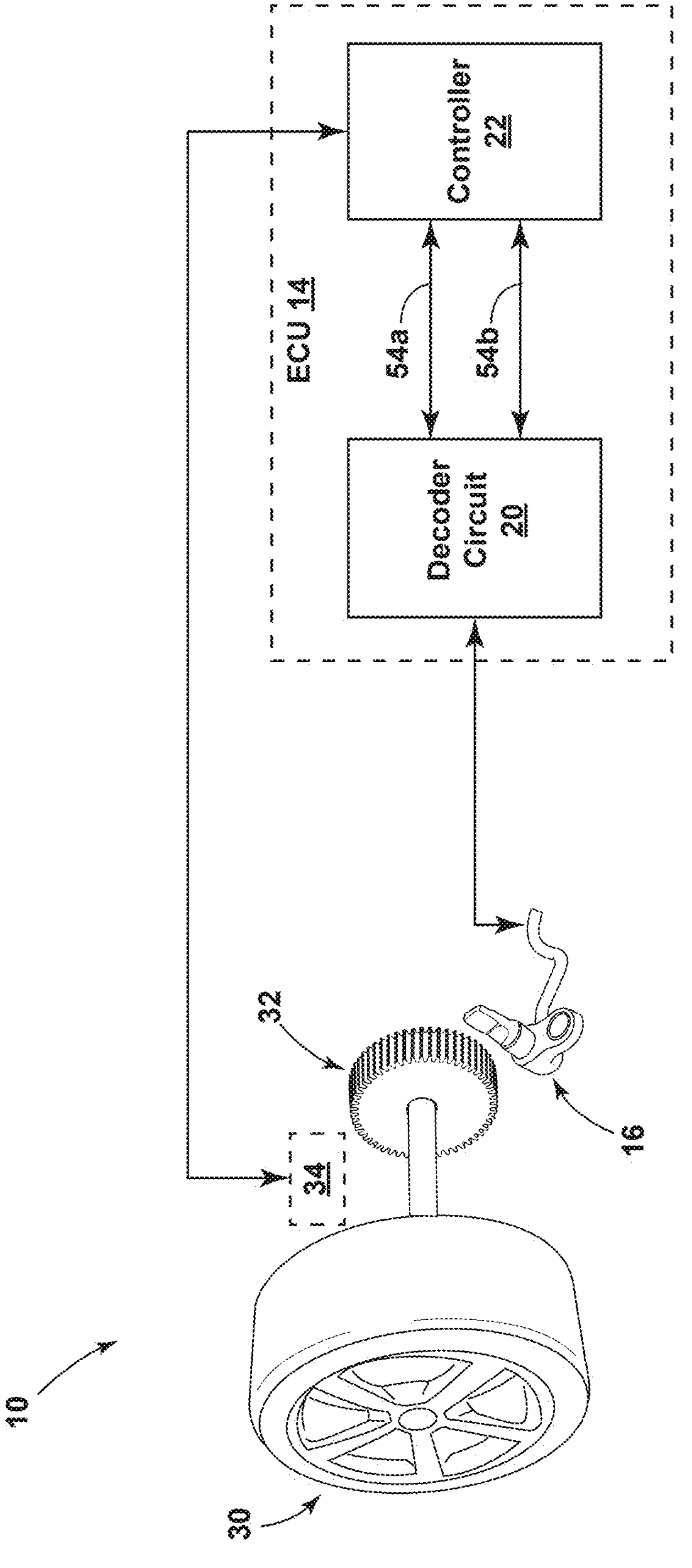

With reference to FIG. 2, in various implementations, the ECU 14 includes a decoder circuit 20 and a controller 22, among others. The decoder circuit 20 may be communicatively coupled to each sensor 16 and the controller 22. The decoder circuit 20 may be an application specific integrated circuit (ASIC), among others.

In various implementations, the controller 22 includes an electronic controller and/or an electronic processor, such as a programmable microprocessor and/or microcontroller. The controller 22 may include an application specific integrated circuit (ASIC). The controller 22 may include a central processing unit (CPU), a memory (e.g., a non-transitory computer-readable storage medium), and/or an input/output (I/O) interface. The controller 22 may perform various functions, including those described in greater detail herein, with appropriate programming instructions and/or code embodied in software, hardware, and/or other medium. The controller 22 may include a plurality of controllers. The controller 22 may be connected to a display, such as a touch screen. The controller 22 may be a microcontroller.

In various implementations, each sensor 16 is disposed adjacent to a wheel 30 of the vehicle 12. For example, a sensor 16 may be disposed adjacent to a magnetized ring (not depicted) or a toothed wheel 32 coupled to a wheel 30. The controller 22 may be commutatively coupled, either directly or indirectly, to a brake assembly 34 of a wheel 30.

In various implementations, a sensor 16 collects information associated with rotational movement of a wheel 30 and transmits the information to the decoder circuit 20 via a signal 40 (e.g., an encoded current signal). For example, the sensor 16 may sense rotation of a magnetized ring or the toothed wheel 32. The sensor 16 may then transmit the information to the decoder circuit 20 by modulating the signal 40, which may allow power and data transfer using two wires. The sensor 16 may be a high-resolution sensor.

In various implementations, the signal 40 includes a 3-level current modulation scheme. The scheme may use three discrete current levels (e.g., 7 mA, 14 mA, and 28 mA, among others) to encode the information. The sensor 16 may transmit the signal 40 to the decoder circuit 20 continuously and/or periodically while the vehicle 12 is in an on state. The sensor 16 may transmit the signal 40 to the decoder circuit 20 while the vehicle 12 is either moving or at a standstill.

Figure 3:
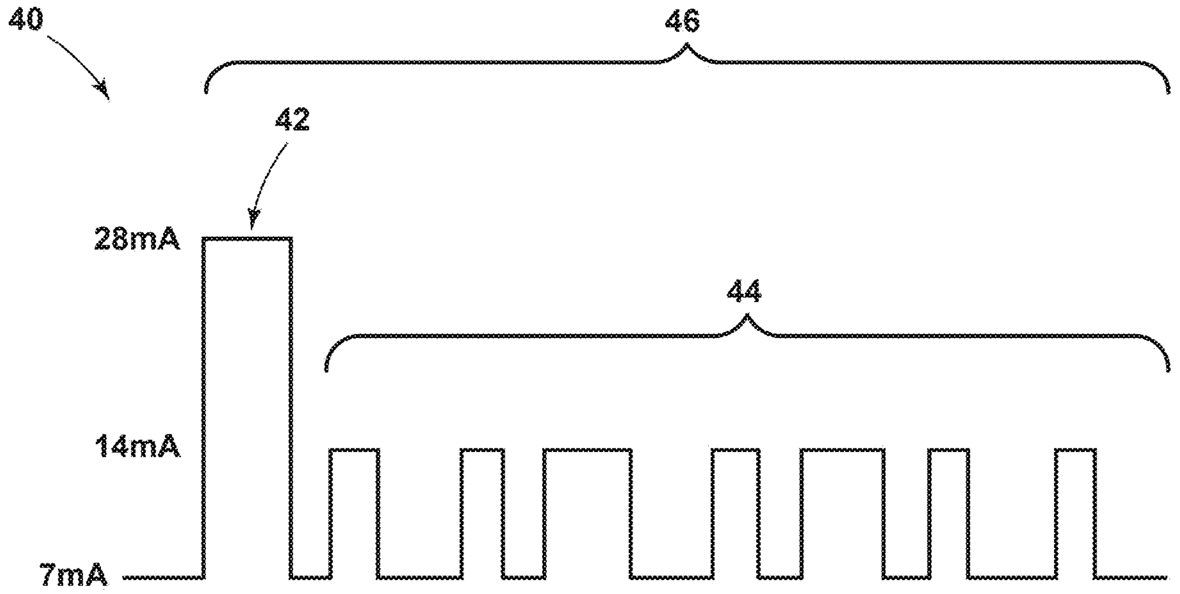
FIGS. 3, 4A, 4B, and 4C are graphical illustrations of example signals generated by a sensor of a system for decoding wheel speed sensor data in accordance with the principles of the present disclosure.

With reference to FIG. 3, an example signal 40 (e.g., an input signal), received by the decoder circuit 20 from a sensor 16, is shown. In various implementations, the signal 40 includes a speed pulse 42 and a set of data bits 44 (e.g., Manchester encoded data bits). The speed pulse 42 may include an amplitude of 28 mA and each of the data bits 44 may include an amplitude of 14 mA. The speed pulse 42 and the set of data bits 44 may together form a sequence 46. For example, each time a sensor 16 detects a pole of a rotating magnetized ring or a tooth of a rotating toothed wheel 32, the sensor 16 may transmit a sequence 46 to the decoder circuit 20. In various implementations, the signal 40 includes a plurality of sequences 46. As will be explained in further details below, the frequency of speed pulses 42 in the signal 40 may define the rotational speed of a wheel 30. The set of data bits 44 may indicate the direction of wheel rotation and provide other diagnostic information.

Figure 6:
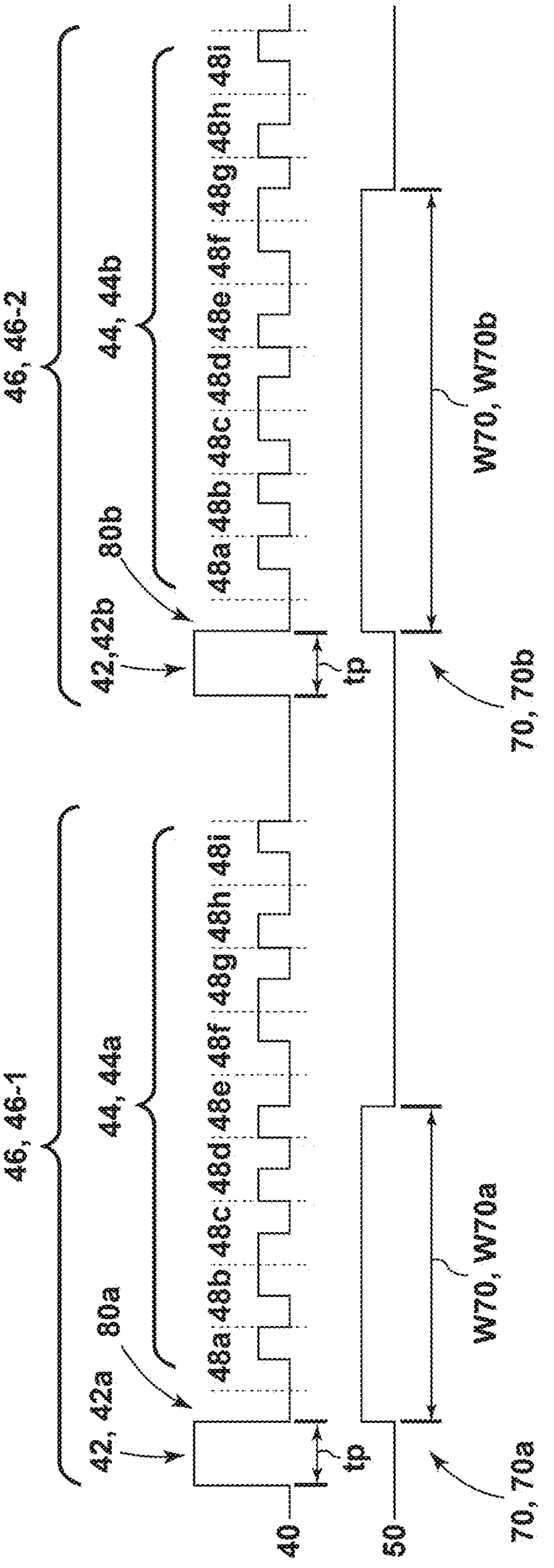
FIGS. 6, 7A, and 7B are graphical illustrations of example signals generated by a sensor and a decoder circuit of a system for decoding wheel speed sensor data in accordance with the principles of the present disclosure.

Referring now to FIG. 6, in various implementations, the set of data bits 44 includes a first data bit **48*a*, a second data bit 48*b*, a third data bit 48*c*, a fourth data bit 48*d*, a fifth data bit 48*e*, a sixth data bit 48*f*, a seven data bit 48*g*, an eighth data bit 48*h*, and/or a ninth data bit 48*i*, among others. Each bit of the set of data bits 44 may include a falling edge or a rising edge. Each bit of the set of data bits 44 may represent a binary value, either 0 or 1. The set of data bits 44 may include more or less than nine data bits. The set of data bits 44 may indicate and/or include the direction of rotation of the wheel 30, status of a sensor 16**, a validity bit of the direction of rotation, an air gap reserve bit, and/or a parity bit, among others.

In various implementations, the signal 40 is based on a set of sensor protocols, including interpolated, standard, and standstill protocols, among others. In various implementations, at least one bit (e.g., the third data bit **48*c*) of the set of bits 44 defines and/or is used by the decoder circuit 20 to determine which sensor protocol is currently being used (e.g., which sensor protocol is associated with a respective sequence 46**). In various implementations, the at least one bit differentiates between standard and interpolated protocols, or between interpolated and standstill protocols.

Figure 4A:
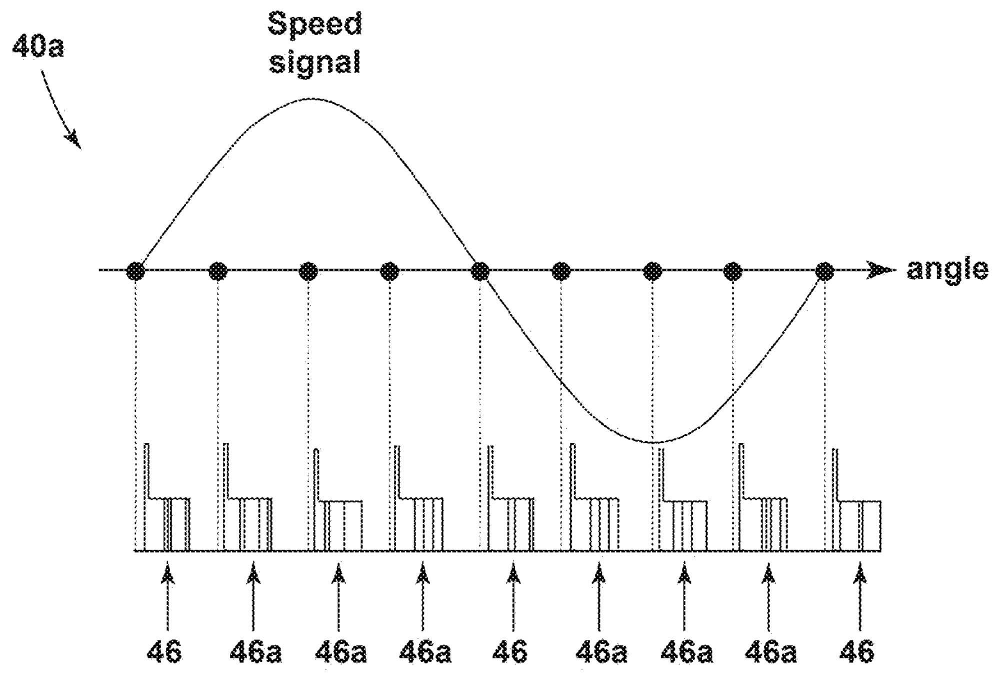

Referring to FIG. 4A, an example signal **40*a*, which includes the interpolated protocol, is shown. A sensor 16 may generate the signal 40*a* with the interpolated protocol when the vehicle 12 is moving at low speeds. For example, the sensor 16 may generate the signal 40*a* when the speed of the vehicle 12** is below a speed threshold (e.g., 5, 10, 25 miles per hour, etc.).

In various implementations, when using the interpolated protocol, a sensor 16 may increase the rate of data it produces. For example, when a vehicle 12 is moving at low speeds (e.g., starting from a stop or moving slowly), a wheel 30 may not rotate quickly enough for the sensor 16 to produce sufficient pulses or data points. In such cases, the sensor 16 may use interpolation to estimate or "fill in the gaps" between the actual magnetic poles of the magnetized ring or gear teeth of the toothed wheel 32. As a result, the sensor 16 may generate interpolated sequences **46*a*, with one or more of these sequences 46*a* disposed between the sequences 46. This interpolation results in higher resolution data, allowing the sensor 16 to generate more data points by estimating the position of the wheel 30 between the existing poles or teeth. In various implementations, the signal 40*a* includes a total number of sequences 46, 46*a*, which is substantially greater (e.g., ×2, ×3, ×4) compared to a signal 40** using the standard protocol.

Figure 4B:
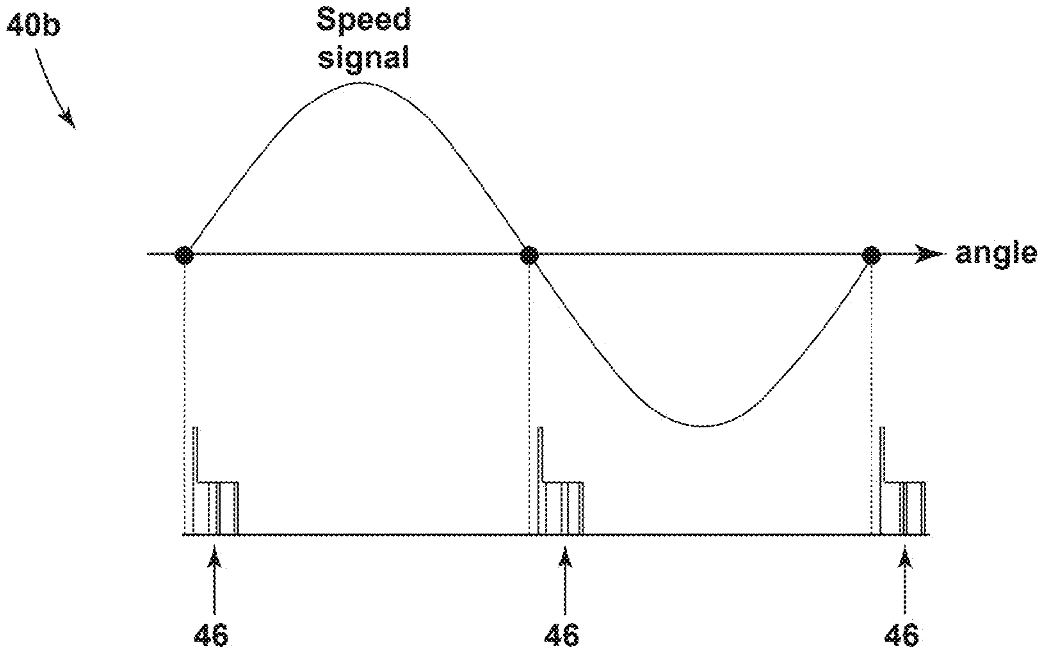

Referring to FIG. 4B, an example signal **40*b*, which includes the standard protocol, is shown. A sensor 16 may generate the signal 40*b* with the standard protocol when the vehicle 12 is moving at high speeds. For example, the sensor 16 may generate the signal 40*b* when the speed of the vehicle 12 is above the speed threshold (e.g., 5, 10, 25 miles per hour, etc.). The signal 40*b* includes the sequences 46 and may not include the interpolated sequences 46*a*. In various implementations, the signal 40*b* includes fewer sequences 46 than the total number of sequences 46, 46*a* of the signal 40*a***.

Figure 4C:
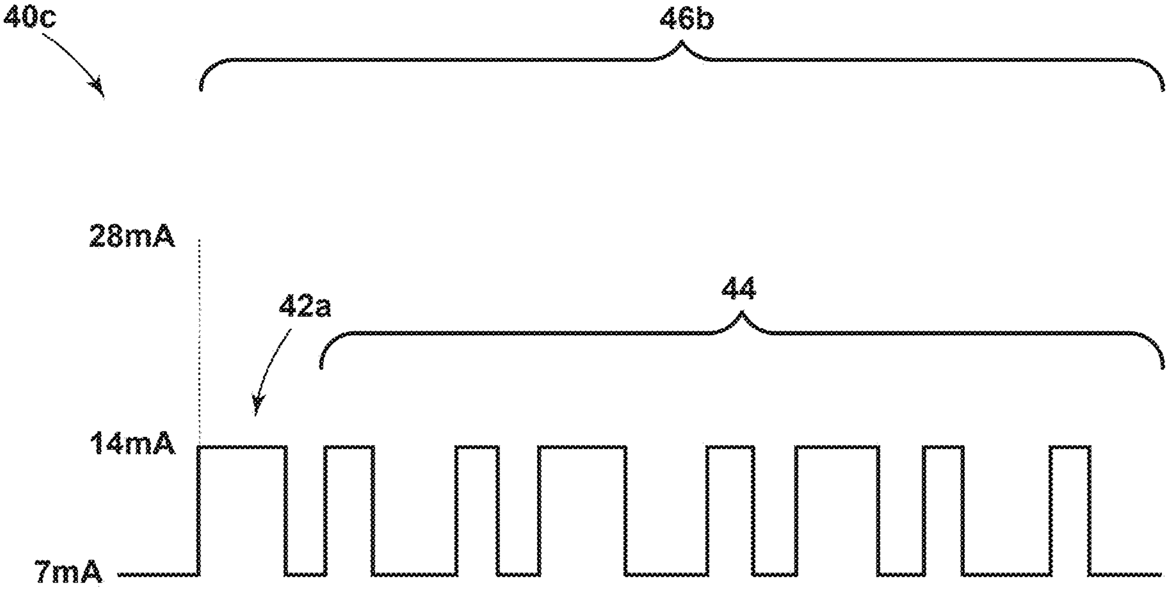

Referring to FIG. 4C, an example signal **40*c*, which includes the standstill protocol, is shown. A sensor 16 may generate the signal 40*c* with the standstill protocol when the vehicle 12 is not moving (e.g., parked, stopped). The signal 40*c* may include one or more sequences 46*b*. A sequence 46*b* may include a speed pulse 42*a* and a set of data bits 44. The speed pulse 42*a* may include an amplitude of 14 mA to indicate that the wheel 30 is not rotating. The amplitude of the speed pulse 42*a* may be less than the amplitude of the speed pulse 42**.

Figure 5:
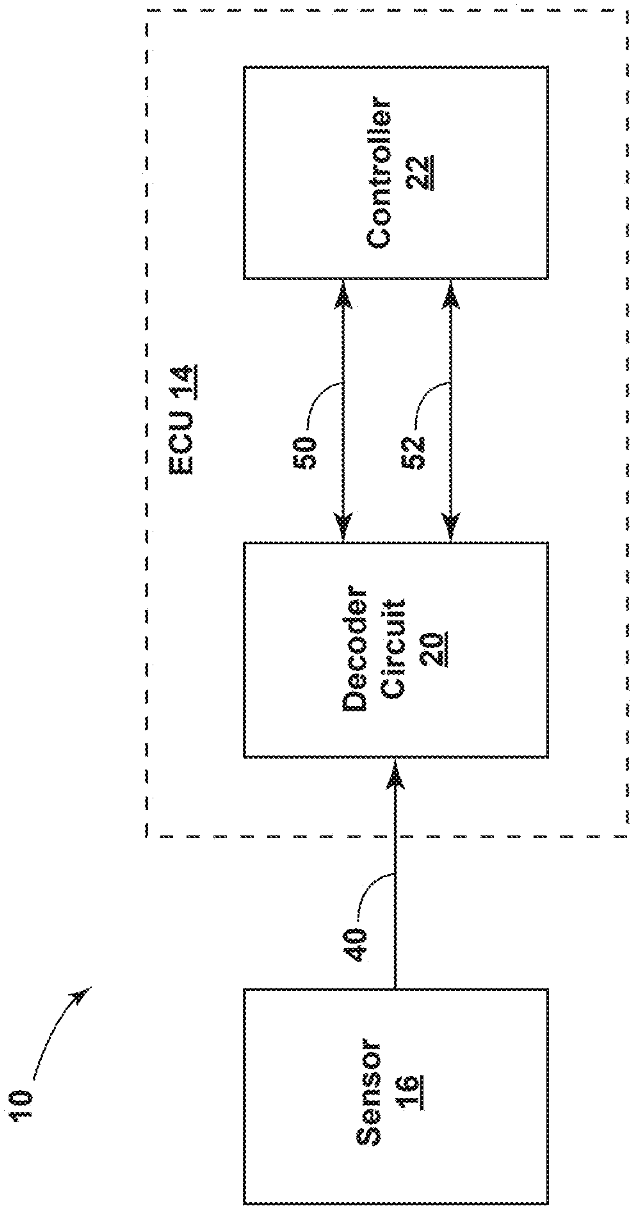
FIG. 5 is a functional block diagram of an example system for decoding wheel speed sensor data in accordance with the principles of the present disclosure.

With reference to FIG. 5, in response to the decoder circuit 20 receiving a signal 40 (e.g., signals **40*a*, 40*b*, 40*c***)

from a sensor 16, the decoder circuit 20 may generate a first output signal 50 and/or a second output signal 52 based on the signal 40. In various implementations, the first output signal 50 (e.g., a frequency signal) indicates the rotational speed of the wheel 30. The first output signal 50 may be based on the speed pulses 42 of the signal 40.

In various implementations, the second output signal 52 may indicate information associated with the movement of a wheel 30 (e.g., direction of wheel rotation and other diagnostic information). The second output signal 52 may be based on the sets of data bits 44 of the signal 40. The decoder circuit 20 may transform (e.g., convert) the signal 40 (e.g., a current signal) to generate the first output signal 50 (e.g., a voltage signal).

In various implementations, the decoder circuit 20 transmits the first and second output signals 50, 52 to the controller 22. The controller 22 may use the first and second output signal 50, 52 to control the operation of the braking system of the vehicle 12 (e.g., the brake assembly 34, among others).

Referring again to FIG. 2, in some example configurations, the decoder circuit 20 transmits the first output signal 50 to the controller 22 via a first communication channel 54*a*. The decoder circuit 20 may transmit the second output signal 52 to the controller 22 via a second communication channel 54*b*. The decoder circuit 20 may transmit the second output signal 52 to the controller 22 in response to receiving a poll request from the controller 22. For example, the controller 22 may transmit poll requests to the decoder circuit 20 periodically (e.g., every 5 ms) via the second communication channel 54*b*. The first and second communication channels 54*a*, 54*b* may operate asynchronously.

With reference to FIG. 6, the first output signal 50 includes a set of signal pulses 70. Each pulse 70 may correspond to a speed pulse 42 of the signal 40. For example, the first output signal 50 is shown including a first pulse 70*a* and a second pulse 70*b*. The first pulse 70*a* may correspond to a first speed pulse 42*a* of the signal 40 and the second pulse 70*b* may correspond to a second speed pulse 42*b*. Each pulse 70 may have a high state (e.g., 5 V) and a low state (e.g., 0 V).

In various implementations, the width W70 of a pulse 70 (e.g., when the pulse is in the high state) indicates which sensor protocol is being used in the corresponding sequence 46 of the signal 40. For example, a width of 250 μs may indicate the standard protocol, a width of 350 μs may indicate the interpolated protocol, and a width of 450 μs may indicate the standstill protocol. As shown in FIG. 6, the first pulse 70*a* includes a width W70*a* of 250 μs, which indicates that a first sequence 46-1 uses the standard protocol. The second pulse 70*b* includes a width W70*b* of 350 μs, which indicates that a second sequence 46-2 uses the interpolated protocol. In various implementations, the controller 22 determines the sensor protocol of pulse 70 based on the width W70 of the respective pulse.

In various implementations, the decoder circuit 20 sets the width W70 of each pulse 70 in the first output signal 50. For example, the decoder circuit 20 may determine the sensor protocol of each sequence 46 in the input signal 40. The decoder circuit 20 may determine the sensor protocol based on the frequency of the speed pulses 42 and/or at least one bit (e.g., the third bit 48*c*) in the set of data bits 44 within the sequence 46. In response to determining the sensor protocol for a sequence 46, the decoder circuit 20 may set the width W70 of the pulse 70 corresponding to the sequence 46.

In various implementations, the decoder circuit 20 transmits the first output signal 50 to the controller 22 so that a pulse 70 of the first signal 50 begins after a falling edge of a speed pulse 42 of the signal 40. This enables the controller 22 to learn the sensor protocol synchronously with edge timing. For example, as shown in FIG. 6, the first pulse 70*a* begins (e.g., rises) after the falling edge 80*a* of the first speed pulse 42*a*, and the second pulse 70*b* begins after the falling edge 80*b* of the second speed pulse 42*b*. In various implementations, the first pulse 70*a* ends (e.g., falls to zero voltage or an off state) after a duration of 250 μs, and the second pulse 70*b* ends after 350 μs.

In various implementations, the decoder circuit 20 sets the width W70 of each pulse 70 to enable the controller 22 to read the second output signal 52, allowing the controller 22 to determine and/or confirm the sensor protocol being used. For example, the width W70 (e.g., 250 μs) of a pulse 70 associated with the standard sensor protocol may be the shorter in comparison with the widths of pulses associated with the interpolated and standstill protocols, because at high vehicle speeds, the pulse 70 and/or the bits 44 of a sequence 46 may be truncated by a subsequent sensor protocol. Additionally, a pulse 70 begins after a falling edge of a speed pulse 42 to allow a low state between pulses 70 when the bits 44 are truncated.

Figure 7A:
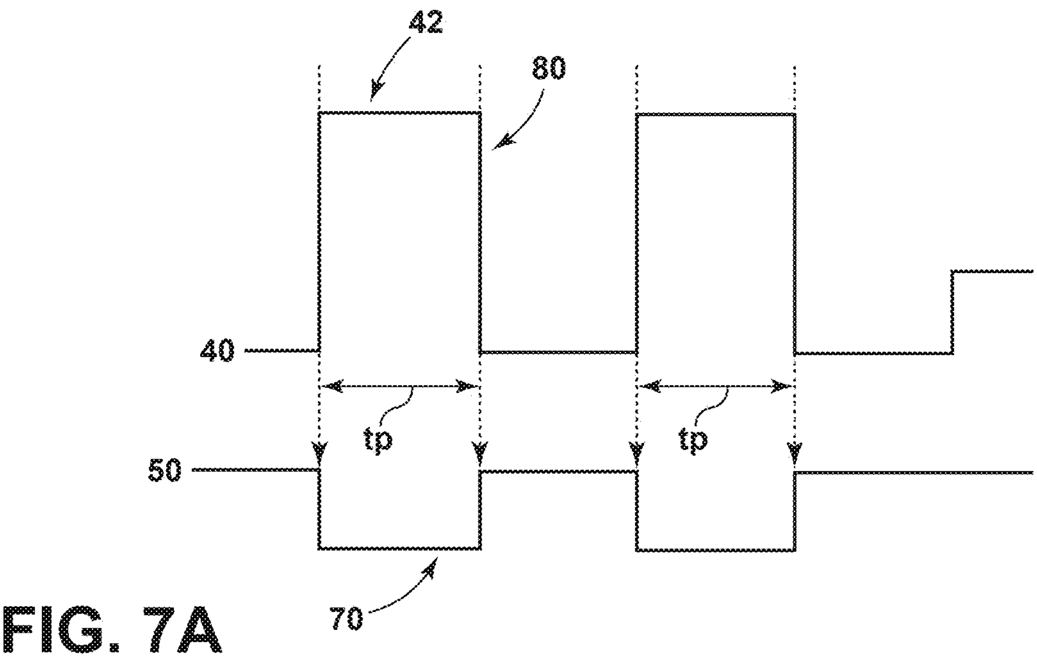

With reference to FIG. 7A, a pulse 70 begins after a falling edge 80 of the speed pulse 42 at the maximum speed allowed by the standard protocol when all of the bits 44 are truncated. In response to the standard protocol being used, the decoder circuit 20 may respond by truncating the widths of the pulses 70 to less than 250 μs. This truncation inhibits an overlap in subsequent pulses 70. The controller 22 may subsequently treat all pulses 70 of 250 μs or less as the standard protocol. In various implementations, only the pulses 70 associated with the standard protocol may be truncated.

Figure 7B:
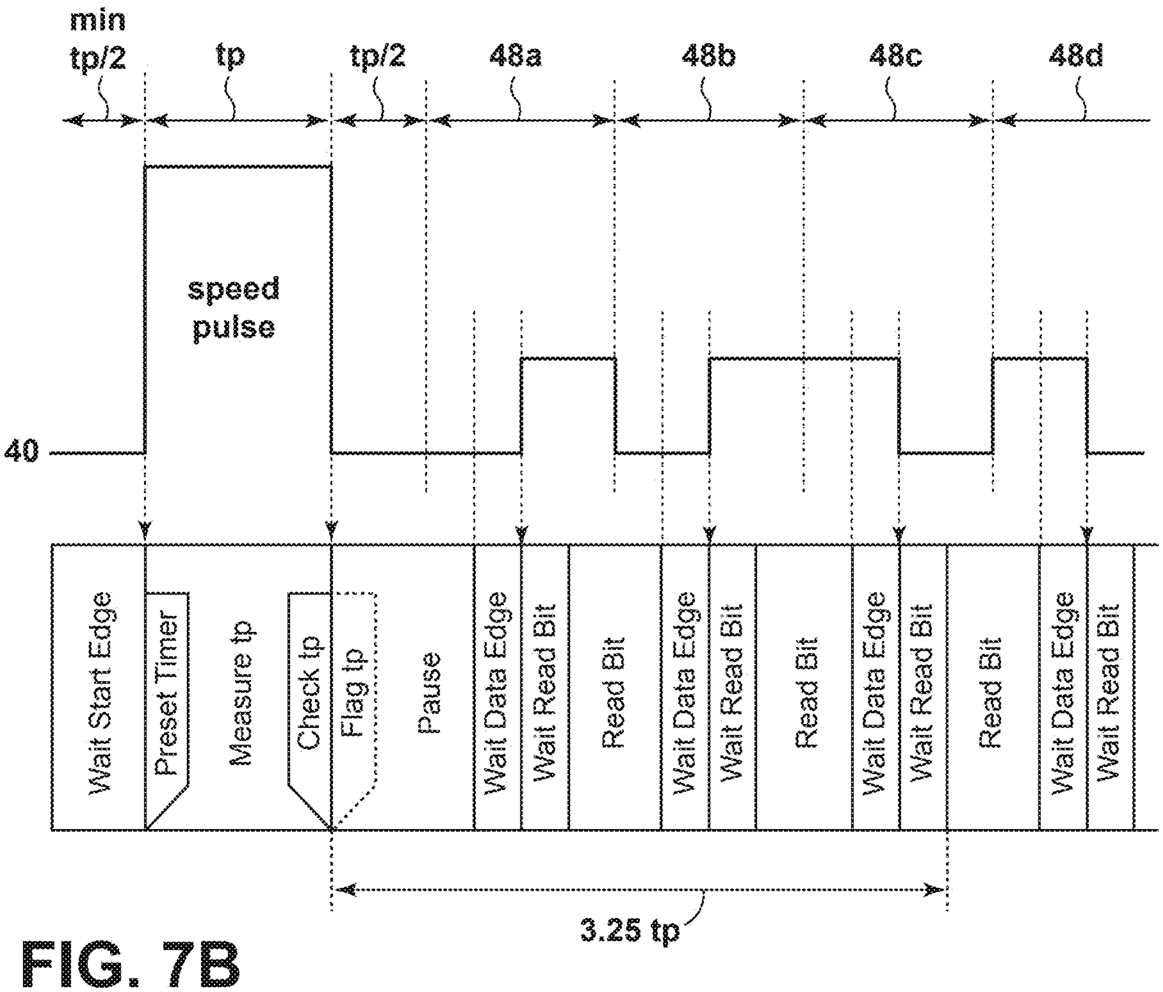

With reference to FIG. 7B, in contrast to the standard protocol, the widths of the pulses 70 associated with the interpolated protocol may not be truncated due to high wheel speed, so there may be no risk of the 350 μs being shortened. However, the interpolated widths must be shorter than the fastest untruncated profile, for example, 440 μs. In various implementations, the widths of the pulses associated with the standstill protocol are the longest pulse. The standstill protocol period (minimum of 105 μs) may introduce no risk for interrupting the 450 μs pulse.

Figure 8:
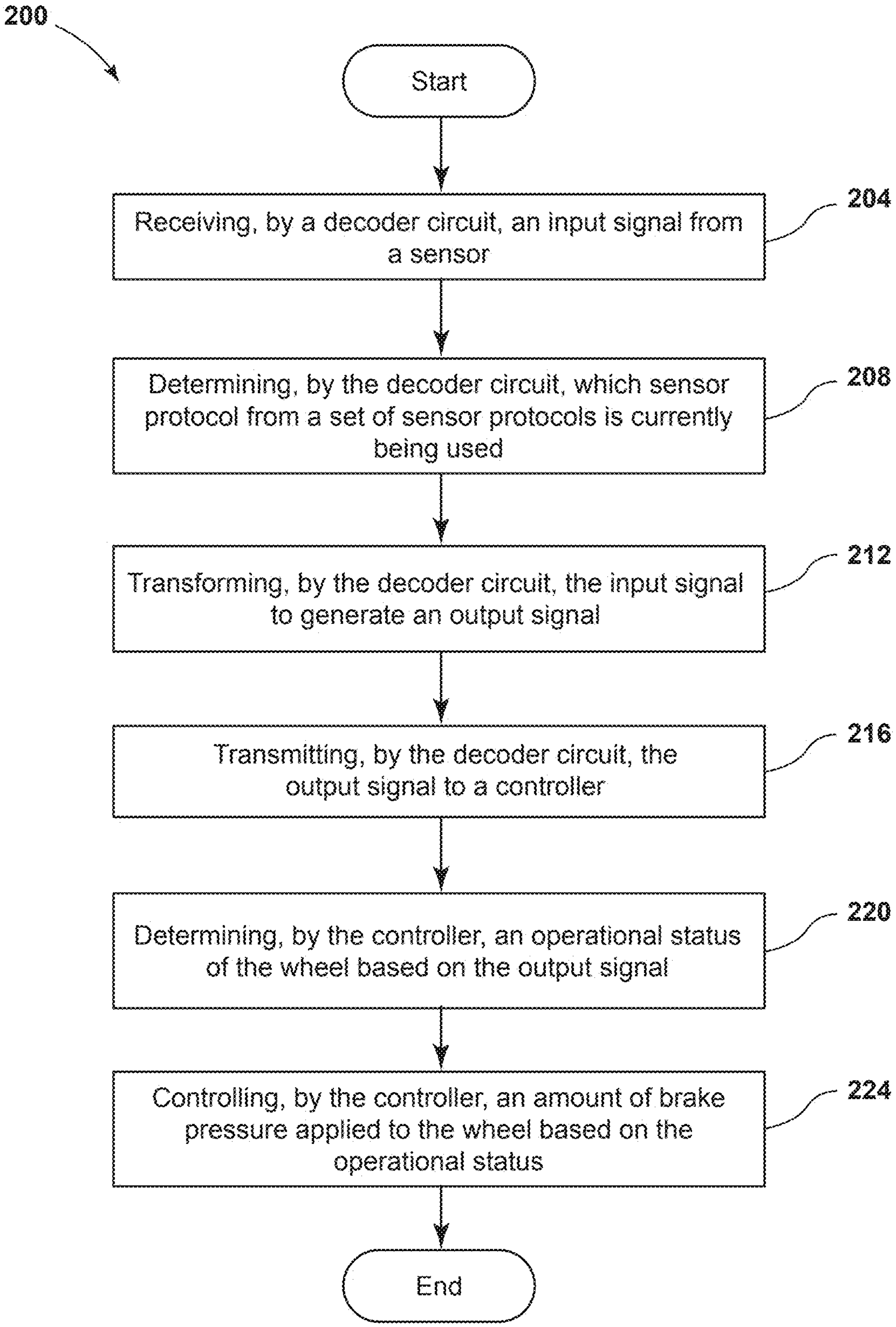
FIG. 8 is a flowchart of an example method for decoding wheel speed sensor data in accordance with the principles of the present disclosure.

FIG. 8 is a flowchart of an example method 200 for decoding wheel speed sensor data. The method 200 may begin at 204. At 204, the decoder circuit 20 may receive an input signal 40 (e.g., signals 40*a*-40*c*) from a sensor 16. The input signal 40 indicates rotational speed of a wheel 30 of the vehicle 12 and information associated with movement of the wheel 30. The input signal 40 may include a plurality of sequences 46. Each sequence 46 may include a speed pulse 42 and a set of data bits 44. The input signal 40 is based on a set of sensor protocols (e.g., interpolated, standard, and standstill protocols). The method 200 may proceed to 208.

At 208, the decoder circuit 20 may determine which sensor protocol from the set of sensor protocols is currently being used. For example, the decoder circuit 20 may determine the sensor protocol of each sequence 46 by determining the frequency of the speed pulse 42 and/or by reading at least one bit (e.g., the third bit 48*c*) of the set of bits 44 in the sequence 46. The method 200 may proceed to 212.

At 212, the decoder circuit 20 may transform the input signal 40 (e.g., a current signal) to generate a first output signal 50 (e.g., a voltage signal) and/or a second output signal 52. The first output signal 50 indicates the rotational speed of the wheel 30. The second output signal 52 indicates the information associated with the movement of the wheel 30.

In various implementations, the first output signal 50 includes a set of signal pulses 70 that correspond to the rotation speed of the wheel 30. The decoder circuit 20 may set a pulse width of the first output signal 50 based on the determined sensor protocol. For example, the decoder circuit 20 may set the pulse width W70 of each pulse 70 based on the determine sensor protocol. The decoder circuit 20 may set a pulse width to 250 μs for the standard protocol. The decoder circuit 20 may set a pulse width to 350 μs for the interpolated protocol. The decoder circuit 20 may set a pulse width to 450 μs for the standstill protocol. The method 200 may proceed to 216.

At 216, the decoder circuit 20 may transmit the first output signal 50 and/or the second output signal 52 to the controller 22. The method 200 may proceed to 220. At 220, the controller 22 may determine an operational status of the wheel 30 based on the first output signal 50 and/or the second output signal 52. This includes the controller 22 determining which sensor protocol from the set of sensor protocols is currently being used, based on the pulse width of the first output signal 50. For example, the controller 22 may determine the widths W70 of the pulses 70 to determine which sensor protocol is being used. The operational status indicates whether the wheel 30 is accelerating or deaccelerating. The controller 22 can more accurately and efficiently determine whether the wheel 30 accelerating or deaccelerating by knowing the sensor protocol being used. The method 200 may proceed to 224.

At 224, the controller 22 may control application of the brake assembly 34 to the wheel 30 based on the operational status. For example, the controller 22 may control an amount of brake pressure applied to the wheel 30 based on the operational status. This includes the controller 22 controlling the amount of brake pressure applied to the wheel 30 to prevent the vehicle 12 from skidding. For example, if the controller 22 determines that a wheel 30 should be decelerating but is instead skipping and/or accelerating, it may increase the brake pressure applied to the wheel 30 (e.g., by controlling the brake fluid supplied to the brake assembly 34). Alternatively, if the controller 22 determines that a wheel 30 should be accelerating but is instead deaccelerating, it may reduce the brake pressure applied to the wheel 30. Then the method 200 may end.

In various implementations, determining the sensor protocol based on pulse widths enhances the performance of the vehicle's braking system while reducing the computational resources required to accurately determine whether the wheels 30 are accelerating or decelerating. This approach eliminates the need for a faster controller computational loop, additional communication channel bandwidth, or extra controller pins, leading to improved efficiency and cost-effectiveness. By optimizing system requirements, the solution ensures more precise control with fewer hardware and processing demands.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "coupled," "engaged," "adjacent," "next to," "on top of," "above," "below," and "disposed." Unless explicitly described as being "direct," when a relationship between first and second elements is described in the above disclosure, that relationship encompasses a direct relationship where no other intervening elements are present between the first and second elements as well as an indirect relationship where one or more intervening elements are present (either spatially or functionally) between the first and second elements.

The term "set" generally means a grouping of one or more elements. The elements of a set do not necessarily need to have any characteristics in common or otherwise belong together. However, in various implementations a "set" may, in certain circumstances, be the empty set (in other words, the set has zero elements in those circumstances). As an example, a set of search results resulting from a query may, depending on the query, be the empty set. In contexts where it is not otherwise clear, the term "non-empty set" can be used to explicitly denote exclusion of the empty set—that is, a non-empty set will always have one or more elements.

A "subset" of a first set generally includes some of the elements of the first set. In various implementations, a subset of the first set is not necessarily a proper subset: in certain circumstances, the subset may be coextensive with (equal to) the first set (in other words, the subset may include the same elements as the first set). In contexts where it is not otherwise clear, the term "proper subset" can be used to explicitly denote that a subset of the first set must exclude at least one of the elements of the first set. Further, in various implementations, the term "subset" does not necessarily exclude the empty set. As an example, consider a set of candidates that was selected based on first criteria and a subset of the set of candidates that was selected based on second criteria; if no elements of the set of candidates met the second criteria, the subset may be the empty set. In contexts where it is not otherwise clear, the term "non-empty subset" can be used to explicitly denote exclusion of the empty set.

The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgments of, the information to element A.

In this application, including the definitions below, the term "module" can be replaced with the term "controller" or the term "circuit." In this application, the term "controller" can be replaced with the term "module." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); processor hardware (shared, dedicated, or group) that executes code; memory hardware (shared, dedicated, or group) that is coupled with the processor hardware and stores code executed by the processor hardware; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module. The term memory hardware is a subset of the term computer-readable medium.

The apparatuses and methods described in this application may be partially or fully implemented by a special-purpose computer created by configuring a general-purpose computer to execute one or more particular functions embodied in computer programs. Such apparatuses and methods may be described as computerized or computer-implemented apparatuses and methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special-purpose computer, device drivers that interact with particular devices of the special-purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

Various example embodiments of the invention are described in the following clauses.

Clause 1: A computerized method of controlling a brake assembly applied to a wheel, the method comprising: receiving, by a decoder circuit, an input signal from a sensor, wherein the input signal indicates rotational speed of a wheel of a vehicle, and wherein the input signal is based on a set of sensor protocols; determining, by the decoder circuit, which sensor protocol from the set of sensor protocols is currently being used; transforming, by the decoder circuit, the input signal to generate an output signal, wherein the decoder circuit sets a pulse width of the output signal based on the determined sensor protocol; transmitting, by the decoder circuit, the output signal to a controller; determining, by the controller, an operational status of the wheel based on the output signal, including: determining, by the controller, which sensor protocol from the set of sensor protocols is currently being used based on the pulse width of the output signal, wherein the operational status indicates whether the wheel is accelerating or deaccelerating; and controlling, by the controller, application of the brake assembly to the wheel based on the operational status.

Clause 2: The method of clause 1, wherein the set of sensor protocols includes a standard sensor protocol, an interpolated sensor protocol, and a standstill sensor protocol.

Clause 3: The method of clause 2, wherein: the sensor uses the standard sensor protocol when the vehicle moves at a speed above a speed threshold, the sensor uses the interpolated sensor protocol when the vehicle moves at a speed below the speed threshold, and the sensor uses the standstill sensor protocol when the vehicle is not moving.

Clause 4: The method of clause 2, wherein the pulse width of the standard sensor protocol is approximately 250 μs.

Clause 5: The method of clause 2, wherein the pulse width of the interpolated sensor protocol is approximately 350 μs.

Clause 6: The method of clause 2, wherein the pulse width of the standstill sensor protocol is approximately 450 μs.

Clause 7: The method of any of clauses 1 through 6, wherein: the input signal is a current signal, and the output signal is a voltage signal.

Clause 8: The method of any of clauses 1 through 7, wherein: the input signal includes a speed pulse and a set of data bits that collectively form a sequence, and the sensor transmits a new sequence to the decoder circuit each time the sensor detects a pole of a rotating magnetized ring or a tooth of a rotating toothed wheel coupled to the wheel.

Clause 9: The method of clause 8, wherein the input signal includes interpolated sequences when the sensor uses an interpolated sensor protocol.

Clause 10: The method of any of clauses 1 through 9, wherein controlling application of the brake assembly to the wheel includes controlling an amount of brake pressure applied to the wheel.

Clause 11: A computerized system for controlling a brake assembly applied to a wheel, the computerized system comprising: memory hardware configured to store instructions; and processor hardware configured to execute the instructions stored by the memory hardware, wherein the instructions include: receiving, by a decoder circuit, an input signal from a sensor, wherein the input signal indicates rotational speed of a wheel of a vehicle, and wherein the input signal is based on a set of sensor protocols; determining, by the decoder circuit, which sensor protocol from the set of sensor protocols is currently being used; transforming, by the decoder circuit, the input signal to generate an output signal, wherein the decoder circuit sets a pulse width of the output signal based on the determined sensor protocol; transmitting, by the decoder circuit, the output signal to a controller; determining, by the controller, an operational status of the wheel based on the output signal, including: determining, by the controller, which sensor protocol from the set of sensor protocols is currently being used based on the pulse width of the output signal, wherein the operational status indicates whether the wheel is accelerating or deaccelerating; and controlling, by the controller, application of the brake assembly to the wheel based on the operational status.

Clause 12: The computerized system of clause 11, wherein the set of sensor protocols includes a standard sensor protocol, an interpolated sensor protocol, and a standstill sensor protocol.

Clause 13: The computerized system of clause 12, wherein: the sensor uses the standard sensor protocol when the vehicle moves at a speed above a speed threshold, the sensor uses the interpolated sensor protocol when the vehicle moves at a speed below the speed threshold, and the sensor uses the standstill sensor protocol when the vehicle is not moving.

Clause 14: The computerized system of clause 12, wherein the pulse width of the standard sensor protocol is approximately 250 μs.

Clause 15: The computerized system of clause 12, wherein the pulse width of the interpolated sensor protocol is approximately 350 μs.

Clause 16: The computerized system of clause 12, wherein the pulse width of the standstill sensor protocol is approximately 450 μs.

Clause 17: The computerized system of any of clauses 11 through 16, wherein: the input signal is a current signal, and the output signal is a voltage signal.

Clause 18: The computerized system of any of clauses 11 through 17, wherein: the input signal includes a speed pulse and a set of data bits that collectively form a sequence, and the sensor transmits a new sequence to the decoder circuit each time the sensor detects a pole of a rotating magnetized ring or a tooth of a rotating toothed wheel coupled to the wheel.

Clause 19: The computerized system of clause 18, wherein the input signal includes interpolated sequences when the sensor uses an interpolated sensor protocol.

Clause 20: The computerized system of any of clauses 11 through 19, wherein controlling the application of the brake assembly to the wheel includes controlling an amount of brake pressure applied to the wheel.

The invention claimed is:

1. A computerized method of controlling a brake assembly applied to a wheel, the method comprising:

receiving, by a decoder circuit, an input signal from a sensor, wherein the input signal indicates rotational speed of a wheel of a vehicle, and wherein the input signal is based on a set of sensor protocols;

determining, by the decoder circuit, which sensor protocol from the set of sensor protocols is currently being used;

transforming, by the decoder circuit, the input signal to generate an output signal, wherein the decoder circuit sets a pulse width of the output signal based on the determined sensor protocol;

transmitting, by the decoder circuit, the output signal to a controller;

determining, by the controller, an operational status of the wheel based on the output signal, including:

determining, by the controller, which sensor protocol from the set of sensor protocols is currently being used based on the pulse width of the output signal, wherein the operational status indicates whether the wheel is accelerating or deaccelerating; and controlling, by the controller, application of the brake assembly to the wheel based on the operational status.

2. The method of claim 1 wherein the set of sensor protocols includes a standard sensor protocol, an interpolated sensor protocol, and a standstill sensor protocol.

3. The method of claim 2 wherein:

the sensor uses the standard sensor protocol when the vehicle moves at a speed above a speed threshold, the sensor uses the interpolated sensor protocol when the vehicle moves at a speed below the speed threshold, and the sensor uses the standstill sensor protocol when the vehicle is not moving.

4. The method of claim 2 wherein the pulse width of the standard sensor protocol is approximately 250 μs.

5. The method of claim 2 wherein the pulse width of the interpolated sensor protocol is approximately 350 μs.

6. The method of claim 2 wherein the pulse width of the standstill sensor protocol is approximately 450 μs.

7. The method of claim 1 wherein:

the input signal is a current signal, and the output signal is a voltage signal.

8. The method of claim 1 wherein:

the input signal includes a speed pulse and a set of data bits that collectively form a sequence, and the sensor transmits a new sequence to the decoder circuit each time the sensor detects a pole of a rotating magnetized ring or a tooth of a rotating toothed wheel coupled to the wheel.

9. The method of claim 8 wherein the input signal includes interpolated sequences when the sensor uses an interpolated sensor protocol.

10. The method of claim 1 wherein controlling application of the brake assembly to the wheel includes controlling an amount of brake pressure applied to the wheel.

11. A computerized system for controlling a brake assembly applied to a wheel, the computerized system comprising:

memory hardware configured to store instructions; and processor hardware configured to execute the instructions stored by the memory hardware, wherein the instructions include:

receiving, by a decoder circuit, an input signal from a sensor, wherein the input signal indicates rotational speed of a wheel of a vehicle, and wherein the input signal is based on a set of sensor protocols;

determining, by the decoder circuit, which sensor protocol from the set of sensor protocols is currently being used;

transforming, by the decoder circuit, the input signal to generate an output signal, wherein the decoder circuit sets a pulse width of the output signal based on the determined sensor protocol;

transmitting, by the decoder circuit, the output signal to a controller;

determining, by the controller, an operational status of the wheel based on the output signal, including:

determining, by the controller, which sensor protocol from the set of sensor protocols is currently being used based on the pulse width of the output signal, wherein the operational status indicates whether the wheel is accelerating or deaccelerating; and controlling, by the controller, application of the brake assembly to the wheel based on the operational status.

12. The computerized system of claim 11 wherein the set of sensor protocols includes a standard sensor protocol, an interpolated sensor protocol, and a standstill sensor protocol.

13. The computerized system of claim 12 wherein:

the sensor uses the standard sensor protocol when the vehicle moves at a speed above a speed threshold, the sensor uses the interpolated sensor protocol when the vehicle moves at a speed below the speed threshold, and the sensor uses the standstill sensor protocol when the vehicle is not moving.

14. The computerized system of claim 12 wherein the pulse width of the standard sensor protocol is approximately 250 μs.

15. The computerized system of claim 12 wherein the pulse width of the interpolated sensor protocol is approximately 350 μs.

16. The computerized system of claim 12 wherein the pulse width of the standstill sensor protocol is approximately 450 μs.

17. The computerized system of claim 11 wherein:

the input signal is a current signal, and the output signal is a voltage signal.

18. The computerized system of claim 11 wherein:

the input signal includes a speed pulse and a set of data bits that collectively form a sequence, and the sensor transmits a new sequence to the decoder circuit each time the sensor detects a pole of a rotating magnetized ring or a tooth of a rotating toothed wheel coupled to the wheel.

19. The computerized system of claim 18 wherein the input signal includes interpolated sequences when the sensor uses an interpolated sensor protocol.

20. The computerized system of claim 11 wherein controlling the application of the brake assembly to the wheel includes controlling an amount of brake pressure applied to the wheel.

* * * * *